United States Patent [19]
Beach et al.

[11] Patent Number: 5,171,430
[45] Date of Patent: Dec. 15, 1992

[54] PLASTIC FILTER

[75] Inventors: Donald W. Beach; Udo E. Holzhausen, both of Cookeville; Lawrence B. Feldhaus, Hendersonville; Charles L. Matheson, Cookeville; Monroe L. Newton, Cookeville; Steve F. Robbins, Cookeville; William F. Langford, Cookeville, all of Tenn.

[73] Assignee: Fleetguard, Inc., Nashville, Tenn.

[21] Appl. No.: 701,901

[22] Filed: May 17, 1991

[51] Int. Cl.⁵ .............................. B01D 27/08
[52] U.S. Cl. ........................... 210/94; 210/440; 210/444; 210/497.01; 210/DIG. 17; 55/490; 55/529
[58] Field of Search ............. 55/490, 529; 210/94, 210/440, 444, DIG. 17, 497.01

[56] References Cited

U.S. PATENT DOCUMENTS

| | | | |
|---|---|---|---|
| 4,021,342 | 5/1977 | Schacht et al. | 210/94 |
| 4,312,751 | 1/1982 | Casamigana | 210/94 |
| 4,770,768 | 9/1988 | Lang | 210/94 |
| 4,859,328 | 8/1989 | Goroezinger et al. | 210/440 |
| 4,992,166 | 2/1991 | Lowsky et al. | 210/443 |
| 5,026,478 | 6/1991 | Tanabe et al. | 210/440 |

Primary Examiner—Robert A. Dawson
Assistant Examiner—W. L. Millard
Attorney, Agent, or Firm—Gary M. Gron

[57] ABSTRACT

This disclosure illustrates a replaceable filter assembly for fluids in which the filter has a shell formed from an injection molded threaded end and an integral blow molded closed end to form a unitary shell. A seal such as a flange is provided adjacent to the threaded end so that a pressure seal can be maintained. A filter medium is supported within the shell so as to direct fluid flow through it to remove contaminants. The shell can be formed from plastic materials such as polyester terephthalate (PET), polyether sulfone (PES), and polyether urethane (PEU). This construction enables an inexpensive filter assembly and, with transparent plastic materials, an indication of the contaminant removal activity within the filter.

19 Claims, 4 Drawing Sheets

PLASTIC FILTER

The present invention relates to filters and more specifically to replaceable filter assemblies.

The use of replaceable filter assemblies in filtering contaminants from lubricant, fuel, coolant, and air systems in internal combustion engines has long been established. The replaceable filter assembly offers the convenience of rapid replaceability at costs that do not substantially exceed those for previous filtration systems in which the element only was replaced.

Since filters remove contaminants, it is a desirable feature of such a device to observe visually what is occurring in the filtration element. Such devices are known as they relate to fuel/water separator filters. In this type of system, a metal filter housing has attached to it a transparent collector bowl which allows the operator to observe any accumulation of moisture and drain it from the bowl by means of a valve. An example of this type of device is found in U.S. Pat. No. 4,619,764. Transparent chambers have been proposed for fuel filtration as shown in U.S. Pat. Nos. 4,017,397 and 4,424,128. Furthermore, transparent chambers have been proposed for oil filters in U.S. Pat. No. 2,179,784.

U.S. Pat. No. 2,179,784 utilizes a glass chamber which would be totally unacceptable when subjected to the vibration, pressure and temperature environment of a heavy duty internal combustion engine such as a diesel. The above patents disclose plastic but only for a minor portion of the filter so that sedimentation can be observed.

It is desirable to make a filter shell from a unitary moldable material such as plastic owing to the ability to mass produce at a very low cost. In the *Modern Plastics Encyclopedia*, 1986-87, pp. 183-194, there is a description of the common techniques used to form various vessels out of plastics. A wide variety of food and beverage containers are now formed using various types of molding procedures. Of particular interest is the system known as injection blow molding in which a portion of the container, such as the thread bearing portion, is formed using an injection molding procedure and the remainder of the container using the same material is formed using a blow mold technique. This offers the advantage of an accurately formed portion for precise configuration of any threads and the like and a single seamless portion in the closed portion of the container. Such a technique offers substantial benefits in production costs and ease of manufacturing.

Heretofore, the application of this type of plastic molding process to the shell of a replaceable filter assembly such as found in the diesel engine has not been attempted. There are a number of reasons why this has not been considered. First, the pressures, temperatures, and material compatibility of the fluids found in an internal combustion engine such as a diesel engine require the selection of exceptional materials for the filter shell composition. It is especially important that the pressure to which the shell is subjected must be absolutely contained, whether or not the filter shell is under pressure as in the case of a coolant or oil filter or is under a pressure lower than atmospheric as in some forms of fuel filters. Up to now the only application of this type of plastic molding process has been to low pressure vessels for retaining food which do not require any significant pressure and/or temperature capability.

In accordance with the present invention, the above problems are solved by a replaceable filter assembly for filtering contaminants for fluids having a pressure significantly different than the pressure existing around the exterior of the filter assembly. The filter assembly comprises a unitary outer shell formed from plastic material having an open, threaded, injection molded end and a closed end blow molded substantially to its final shape. A filtration medium is positioned within the shell and is supported in such a way that fluid flow is directed through the filtration medium for removing contaminants from fluid which passes through. Sealing means are provided adjacent the threads of the threaded, injection molded end whereby the shell forms a pressure vessel effectively sealed around its open end when installed.

The above and other related objects and features of the present invention will be apparent from a reading of the following description of the disclosure shown in the accompanying drawings and the novelty thereof pointed out in the appended claims.

Figure 1:
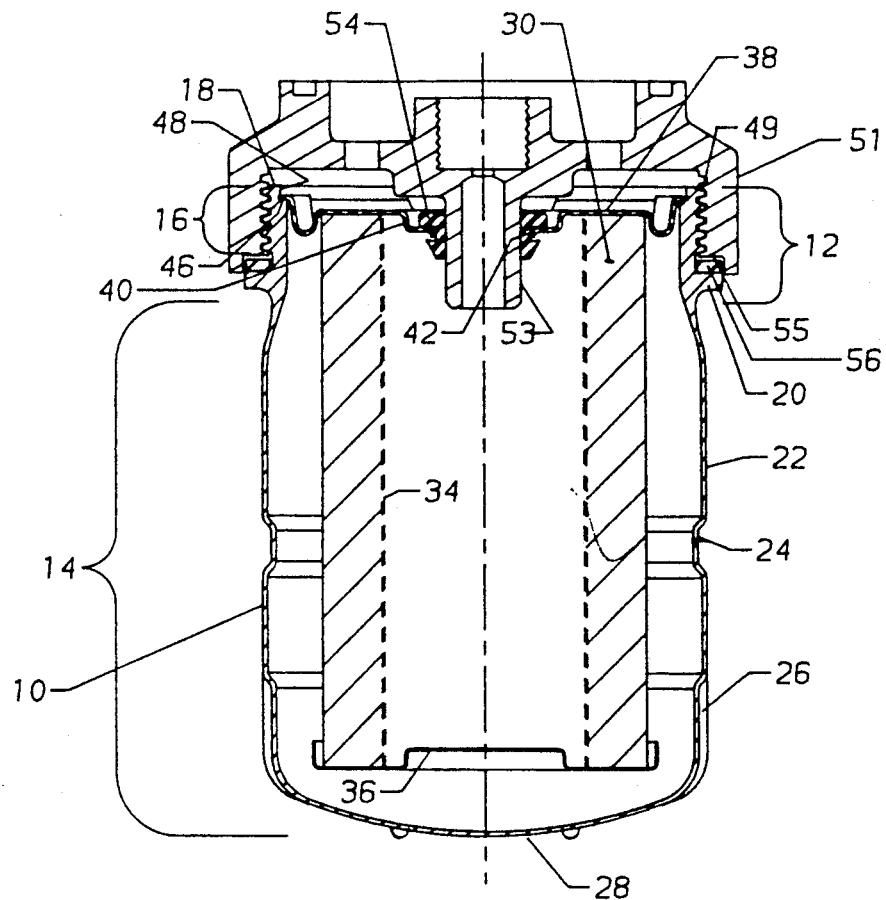
FIG. 1 is a longitudinal section view of a filtration assembly embodying the present invention and a base with which it is used.

Referring now to FIG. 1, there is shown a filter assembly 10 comprised of an injection molded end portion 12 and a blow molded closed portion 14. The injection molded end portion 12 has an outwardly threaded section 16 adjacent the end face 18. Preferably, the threads formed in the section 16 are of an Acme thread configuration so as to withstand substantial axial forces. Adjacent the lower end of the threaded portion 16, as shown in FIG. 1, is an integral circumferential flange 20 having a sufficient thickness to withstand axial forces encountered when the filter assembly 10 is installed. Integral with end portion 12 is a closed blow molded end portion 14 comprised of a relatively thin annular wall 22 having an annular recess 24 and a plurality of axially directed ribs 26 adjacent the lower wall 28 of Section 14.

Positioned within the outer shell portions 12, 14 is a filtration medium illustrated as an annular filtration medium 30 coaxial with the axis of the filter assembly and extending through a substantial portion of the shell. The filtration medium 30 has a central perforated tube 34 and a formed imperforate end cap 36 secured to the lower portion of the filtration medium 30 by suitable means such as an adhesive. The upper portion of the filtration medium 30 is supported in a cantilever fashion by a plate 38 herein shown as a stamped metal plate.

Figure 2:
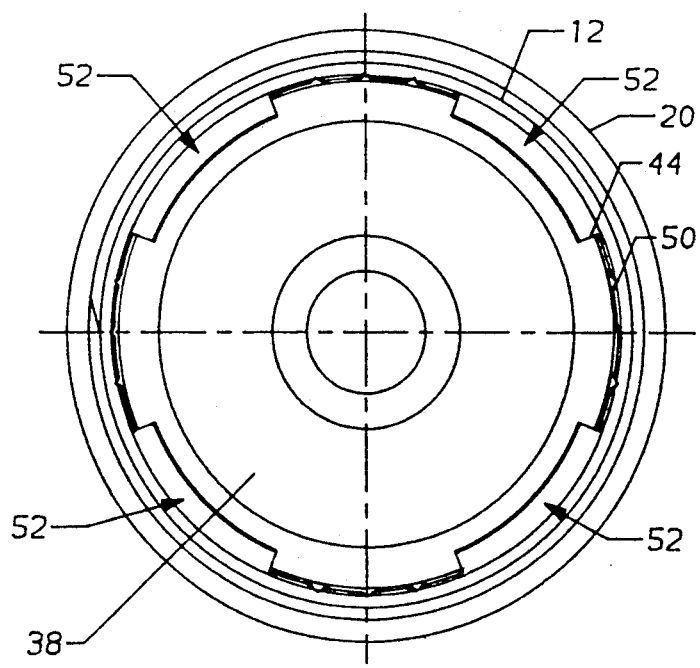
FIG. 2 is an end view of the filtration assembly of FIG. 1 but without the base of FIG. 1.

As viewed particularly in FIGS. 1 and 2, plate 38 has an annular recess 40 which receives filter medium 30.

The filtration medium 30 may be secured in recess 40 by suitable means such as an adhesive. Plate 38 has a central opening 42 and a plurality of tabs 44 extending radially outward towards the walls of the injection molded end 12. Tabs 44 abut a shoulder 46 which extends to an inward facing annular wall 48 formed on the interior of injection molded end 12. Tabs 44 have projections 50 which are angled so that when the tabs 44 are placed against shoulder 46 the projections 50 abut interior wall 48 and thus lock end plate 38 in place. The result is that the filtration element is supported cantileverly within the interior of the filter. As particularly shown in FIG. 2, the space between the tabs 44 defines openings 52 at spaced intervals around the periphery of plate 38 to permit the flow of fluid. The central portion of the opening 42 in the center of plate 38 has a sealing ring 54 positioned therein which provides a seal around opening 42.

When the replaceable filter assembly 10 is installed on an internal combustion engine, it is threaded into threads 49 of a corresponding base 51 so that a tubular fluid flow element 53 projects through the sealing ring 54 and the threads 16 engage corresponding inwardly directed female threads 40 to advance the flange 20 to the point where a lathe cut or O-ring sealing ring 56 provides sealing contact between an opposed surface 55 on the base 51 and the flange 20.

The filter housing as previously mentioned is formed using the injection blow molded technique described in the *Modern Plastics Encyclopedia*. This consists of a first stage in which an amount of material sufficient to make up the entire quantity necessary to form the shell is placed into an injection mold in which the plastic is melted and injected into a steel mold cavity to produce a preform or parison. For this application the preform is shaped like a test tube with a finished threaded portion at the top. The injection molding technique provides a high degree of accuracy so that the threads 16 may be formed using an Acme thread pattern which gives a significantly increased holding strength so as to effect a positive pressure seal.

Once the injection molded portion is completed, the mold may be indexed to another station where air pressure is applied to the heated plastic so as to blow the plastic material against the female mold which substantially conforms to the ultimate shape of the exterior of the filter shell. The quantity of plastic is controlled so as to control the wall thickness of the shell. The blow molding gives a precise and uniform control over the thickness of the vessel and avoids any stress concentrations that would result in forming the entire shell using an injection molded technique. It should be noted that a stretch blow molding technique may also be used to form the portion 14 and that blow molding is intended to cover this form of molding.

The particular material for the plastic needs to be selected having regard for the ability of the material to withstand the petroleum based and glycol based fluids found in the lubrication, fuel, and cooling systems, respectively, of the internal combustion engine. Several particularly useful compounds have been identified for this purpose. They are:

polyester terepthalate (PET)
polyether sulfone (PES)
polyether urethane (PEU)

These materials have a high resistance to the temperature pressures in a diesel engine and resist the solvent action of the fluids contained in them. Furthermore, they provide transparency which is ideal to enable visual inspection of the fluid condition passing through the filter.

Figure 3:
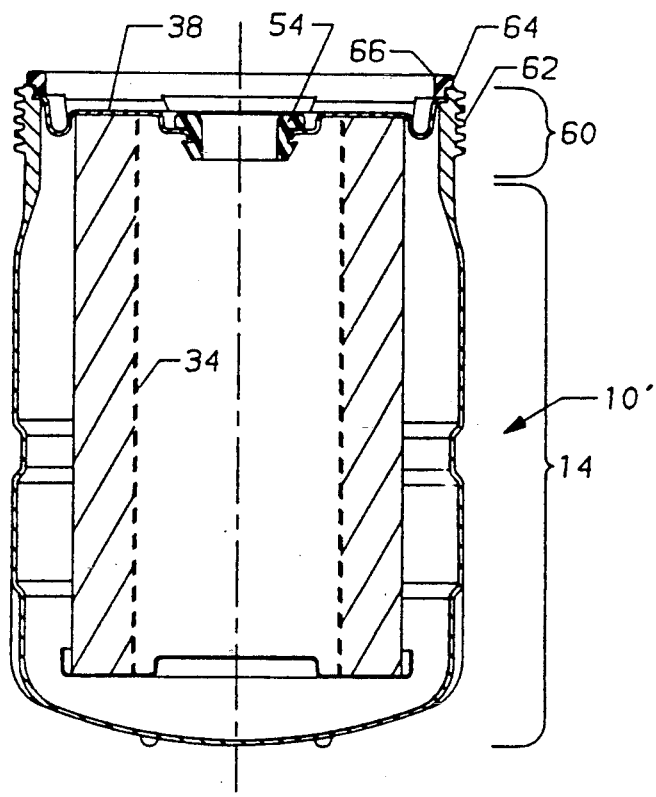
FIG. 3 is a longitudinal section view of an alternative embodiment of the invention shown in FIG. 1.

FIG. 3 shows an alternative provision for an end seal on the filter shell housing of the filter assembly 10'. In this figure a threaded section 60, which is also injection molded, has outer facing threads 62 but no corresponding flange. The annular end face 64 of the threaded section 60 is sufficiently wide to support a seal ring 66 of suitable resilient material. The net result of this type of configuration is to provide the sealing function at seal ring 66 substantially in line with the threaded section 62 so as to effect a positive pressure seal. Only the shell portion of the filter assembly is shown in FIG. 3 to further emphasize the relationship of the seal 66 and the thread 62. It should be apparent to those skilled in the art that the manner of securing and supporting the filtration element within the shell as shown in FIGS. 1 and 2 as well as alternative embodiments described in connection with the additional figures in this application may be employed in the sealing arrangement of FIG. 3.

Figure 4:
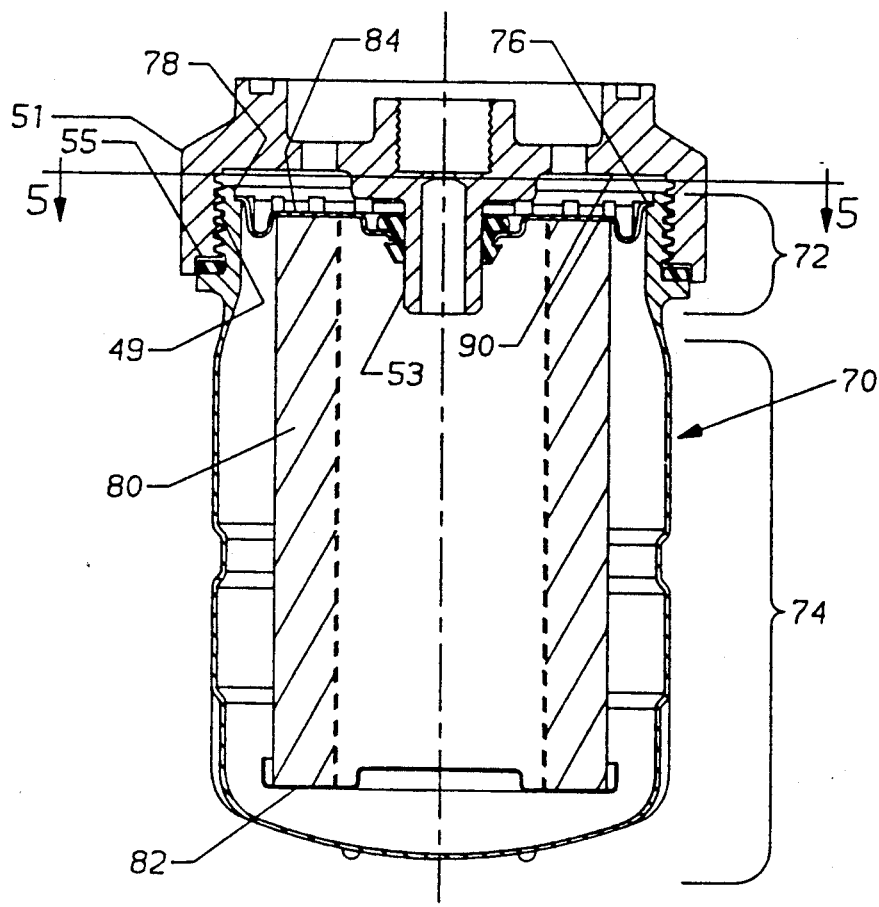
FIG. 4 is a longitudinal section view of a filtration assembly showing an alternate embodiment of the invention and a base with which it is used.
Figure 5:
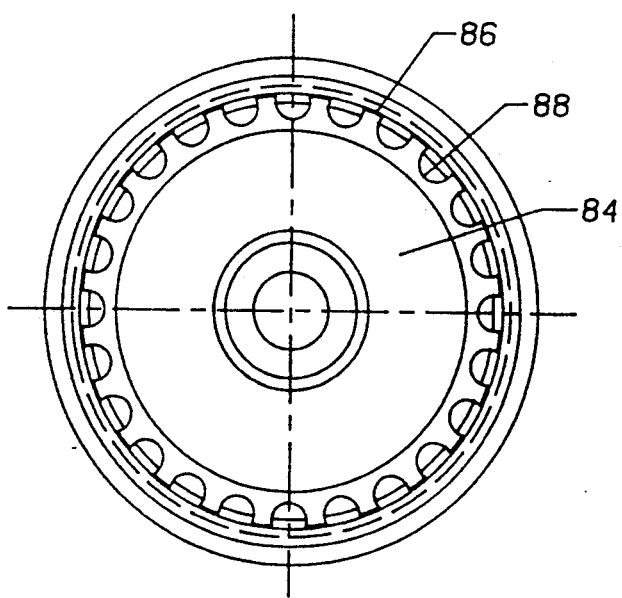
FIG. 5 is an end view of the filter assembly of FIG. 4 taken on lines 5—5 of FIG. 4.

Referring now to FIG. 4 there is shown still another alternative embodiment of the present invention in which a filter assembly 70 comprises an injection molded threaded end portion 72 and a blow molded lower end 74 which are formed from plastic material as described above. Included within the annular threaded end 72 is a shoulder 76 extending to an inwardly facing wall 78. The filtration medium 80 is generally annular in form, has a closed end plate 82, and is cantileverly supported in end plate 84. As particularly shown in FIG. 5, the end plate 84 has a circular periphery 86 interrupted at a plurality of positions around its periphery by circular holes 88 which in effect form scallops. The circular periphery 86 in between the circular holes 88 generally is adjacent to or abuts the inner facing wall 78 to align the end plate 84. The depth of the shoulder 76 is selected so that when the threaded portion 72 of the filter assembly 70 is installed and threaded into sealing engagement during installation, the end plate 84 is sandwiched in between the shoulder 76 and a corresponding mounting surface on the base 51. This surface can be either the tubular flow element 53 as shown or the base wall 90 toward which the threads 49 extend. If it is desired, additional securing means such as the projections 50 of FIG. 1 may be provided so as to prevent the end plate from slipping out of the filter assembly when it is not installed on an engine.

Figure 6:
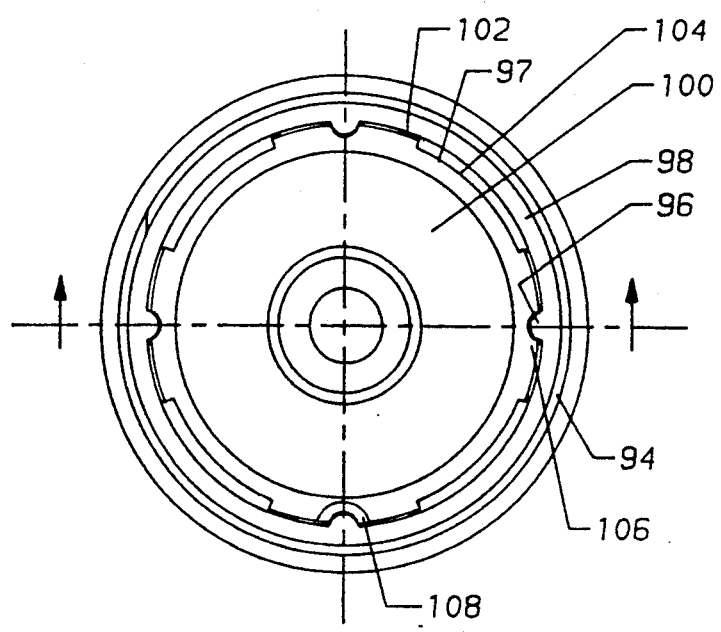
FIG. 6 is an end view of another embodiment of the present invention.

Referring to FIG. 6 there is shown still another approach for securing the filtration medium within the filter housing. As shown in this Figure, the threaded end portion 94 of the filter housing has a series of axially extending ribs 96 extending from the end face 98 of the threaded portion and terminating at a shoulder 97, the depth of which is selected for positioning and mounting an end plate 100. The end plate 100 has a generally circular peripheral periphery 102 interrupted by a plurality of arcuate cutouts 104 so as to permit fluid flow. A plurality of notches 106 project radially inward from the periphery 102 and are received over the corresponding ribs 96. The shoulder 97 at the base of the ribs 96 establishes the location of the plane of end plate 100. Once the plate 100 is in position against the shoulder 97, the plastic ribs 96 are heated so that they deform and flow over the periphery of the plate 100 in the form of a plastic blob 108 shown only at the 6 o'clock position of FIG. 6. Thus the end plate 100 may be employed to cantileverly mount the filtration medium which is secured to it.

Figure 7:
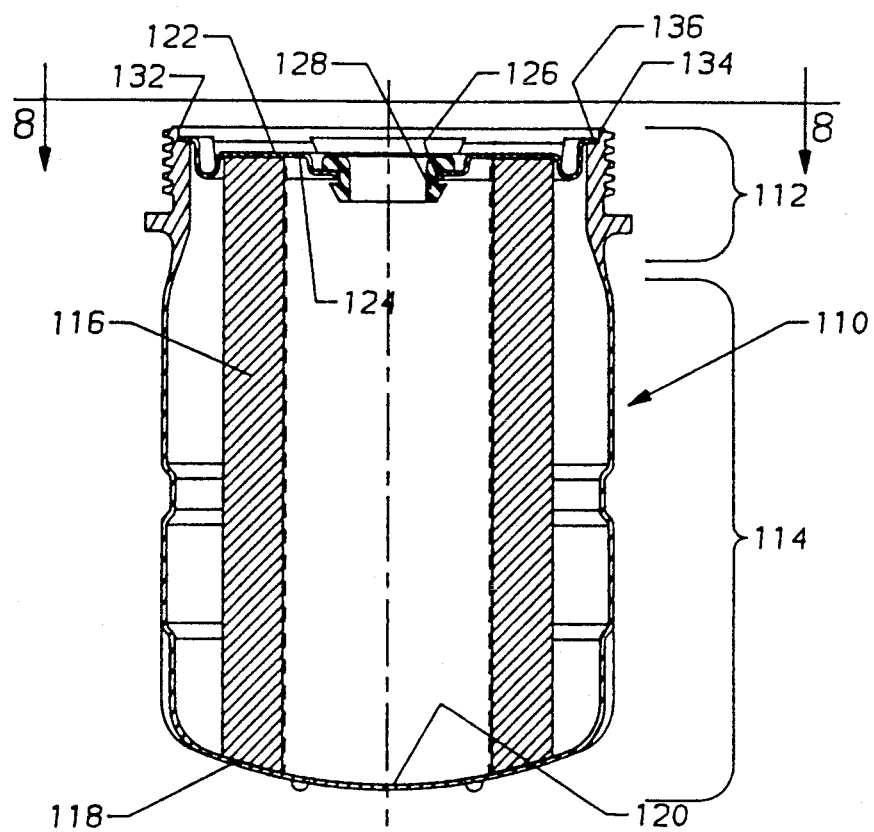
FIG. 7 is a longitudinal section view of still another embodiment of the present invention.
Figure 8:
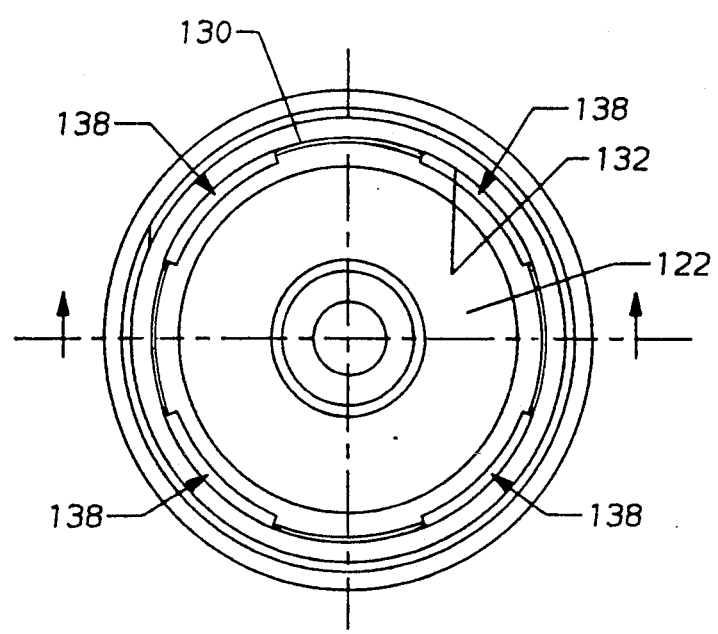
FIG. 8 is an end view of the filtration assembly of FIG. 7, taken on lines 8—8 of FIG. 7.

Reference is now made to FIGS. 7 and 8 which show an alternative manner of securing the filtration medium. In this Figure a filter shell 110 is comprised of an injection molded threaded end 112 and a blow molded end 114. The filtration medium 116 is mounted within the outer shell 110 so that its bottom end face 118 is secured to and mounts against the bottom wall 120 of the blow molded portion 114. The manner in which the filtration medium 116 is secured against wall 120 may be any one of a number of ways including a suitable adhesive. The opposite end of the filtration medium 116 is secured to end plate 122 which has an annular recess 124 for receiving the annular filtration medium 116 and a central opening 126 around which a molded seal ring 128 is positioned. As shown particularly in FIG. 8 the end plate 122 has a circular periphery 130 which is received in an inner facing annular wall 132 extending towards the end wall 134 of the threaded portion 112 from a shoulder 136. The circular periphery 130 of plate 122 is interrupted by arcuate cutouts 138 so as to provide a flow of fluid past that portion of the plate. The net result is that the curned periphery 130 of the end plate 122 is supported in at least the radial direction by the inner facing wall 134 in the threaded end 112. Thus, any axial expansion of the filtration element 116 due to increases in temperature is compensated for while at the same time permitting the sealing ring 128 to be accurately centered on a corresponding tube or fluid connection extending through the center of the end plate 122.

In operation, the filter that is the subject of the present invention may be installed and removed in the fashion of any other replaceable filter for an internal combustion engine. Because the filter shell and means for threading to the engine is contained in a single unit, the manufacturing costs are greatly reduced. The techniques of injection molding and blow molding are established techniques that can be used to great advantage to produce a superior filter. When the number of components in a filter constructed according to the present invention are compared to that of an ordinary filter, it is apparent that the sealing and securing means in current filters are much more complicated resulting in higher material and manufacturing costs.

While preferred embodiments of the present invention have been described, it should be apparent to those skilled in the art that it may be practiced in other forms without departing from the spirit of the scope thereof.

Having thus described the invention, what is claimed is novel and desired to be secured by Letters Patent of the United States is:

1. A replaceable filter assembly for filtering contaminants from fluids having a pressure significantly different than the pressure existing around the exterior of the filter assembly, said filter assembly comprising:
   a unitary outer shell formed from plastic material and having an open, threaded, injection molded end, and a closed end blow molded substantially to its final shape, said threaded end having outward facing threads,
   a filtration medium means positioned within said shell,
   means for supporting said filtration medium means within said shell,
   means for directing fluid flow through said filtration medium means whereby contaminants are removed from fluid passing through said filtration medium means, and
   sealing means coacting with said threaded injection molded end and adjacent said threads whereby said shell forms a pressure vessel effectively sealed around its open end when installed.

2. A replaceable filter assembly as in claim 1 wherein said sealing means comprises:
   a circumferential flange formed on said unitary outer shell between said threaded end and said blow molded end,
   a seal means positioned on said flange for providing a pressure seal when said filter assembly is installed by threading into position.

3. A replaceable filter assembly as in claim 2 wherein said circumferential flange faces outward.

4. A replaceable filter assembly as in claim 1 where in said sealing means comprises:
   a circumferential end surface on the threaded end of said outer shell, and
   a sealing ring positioned on said circumferential end surface for providing a pressure seal when said filter assembly is installed by threading into position.

5. A replaceable filter assembly as in claim 1 wherein the walls of the blow molded end of said outer shell are substantially in line with the threaded end thereby minimizing any bending loads on the junction between the threaded end and the blow molded end when a pressure differential is applied across said outer shell.

6. A replaceable filter assembly as in claim 1 wherein the blow molded end of said outer shell has formed thereon at least one axially extending undulation to facilitate installation and removal of said filter assembly.

7. A replaceable filter assembly as in claim 6 where said undulation comprises a plurality of axially extending ribs integrally formed on the blow molded end of said outer shell.

8. A replaceable filter assembly as in claim 1 wherein said plastic material is polyester terepthalate.

9. A replaceable filter assembly as in claim 1 wherein said plastic material is polyether sulfone.

10. A replaceable filter assembly as in claim 1 wherein said plastic material is polyether urethane.

11. A replaceable filter assembly as in claim 1 wherein said threads are formed with an Acme thread.

12. A replaceable filter assembly as in claim 1 wherein said filtration medium means is generally elongated and said filtration medium supporting means comprises:
   an end plate to which one end of said elongated filtration media means is secured, said end plate being connected to said outer shell adjacent said threaded end and permitting flow through said end plate generally around the periphery thereof.

13. A replaceable filter assembly as in claim 12 wherein:
   said end plate is formed from deformable material having a plurality of tabs projecting radially outward therefrom, and
   said threaded end of said outer shell has an annular shoulder on the inner facing side, said tabs abutting said shoulder and being deformed into said threaded end to support said filtration medium means and permit fluid flow through the periphery of said end plate.

14. A replaceable filter assembly as in claim 13 herein said end plate is a stamped metal plate.

15. A replaceable filter assembly as in claim 13 wherein:
said filtration medium means is annular in form and has one end thereof sealingly supported by said end plate,
said filtration medium means has an imperforate end plate sealingly connected to the opposite end there, said end plate having a generally central opening therethrough and a seal ring around said opening, whereby flow is directed radially through said annular filtration medium means via the periphery of said end plate and the central opening of said end plate.

16. A replaceable filter assembly as in claim 13 wherein:
said end plate has a generally circular periphery and a plurality of openings formed around the end plate at least adjacent the periphery thereof to permit flow therethrough,
said threaded end of said outer shell has an annular shoulder on the inner facing side, said annular shoulder being positioned to receive the circular periphery of said end plate and supporting at least one face of said end plate by clamping when the replaceable filter assembly is installed.

17. A replaceable filter assembly as in claim 1 wherein said filtration medium means is generally elongated and, said filtration medium supporting means comprises:
means for securing one end of the filtration medium means to the blow molded end of said filter shell, and
an end plate secured to the opposite end of said filtration medium means and cooperating with the threaded end of said outer shell to at least provide support to said filtration medium means in a radial direction.

18. A replaceable filter assembly as in claim 12 wherein:
said end plate is generally circular in form and has a plurality of notches, and
the threaded end of said outer shell has a plurality of ribs over which the notches on the end plate are received, said threaded end being locally melted adjacent said recesses to lock the outer ends of end cap in place.

19. A replaceable filter assembly for filtering contaminants from fluids having a pressure significantly different than the pressure existing around the exterior of the filter assembly, said filter assembly comprising:
an outer shell formed from molded plastic material and having an open, threaded end and a closed end, said threaded end having outward facing threads,
a filtration medium means positioned within said shell,
means for supporting said filtration medium means within said shell,
means for directing fluid flow through said filtration medium means whereby contaminants are removed from fluid passing through said filtration medium means, and
sealing means coacting with said threaded end and adjacent said threads whereby said shell forms a pressure vessel effectively sealed around its open end when installed.

* * * * *